Patented May 2, 1939

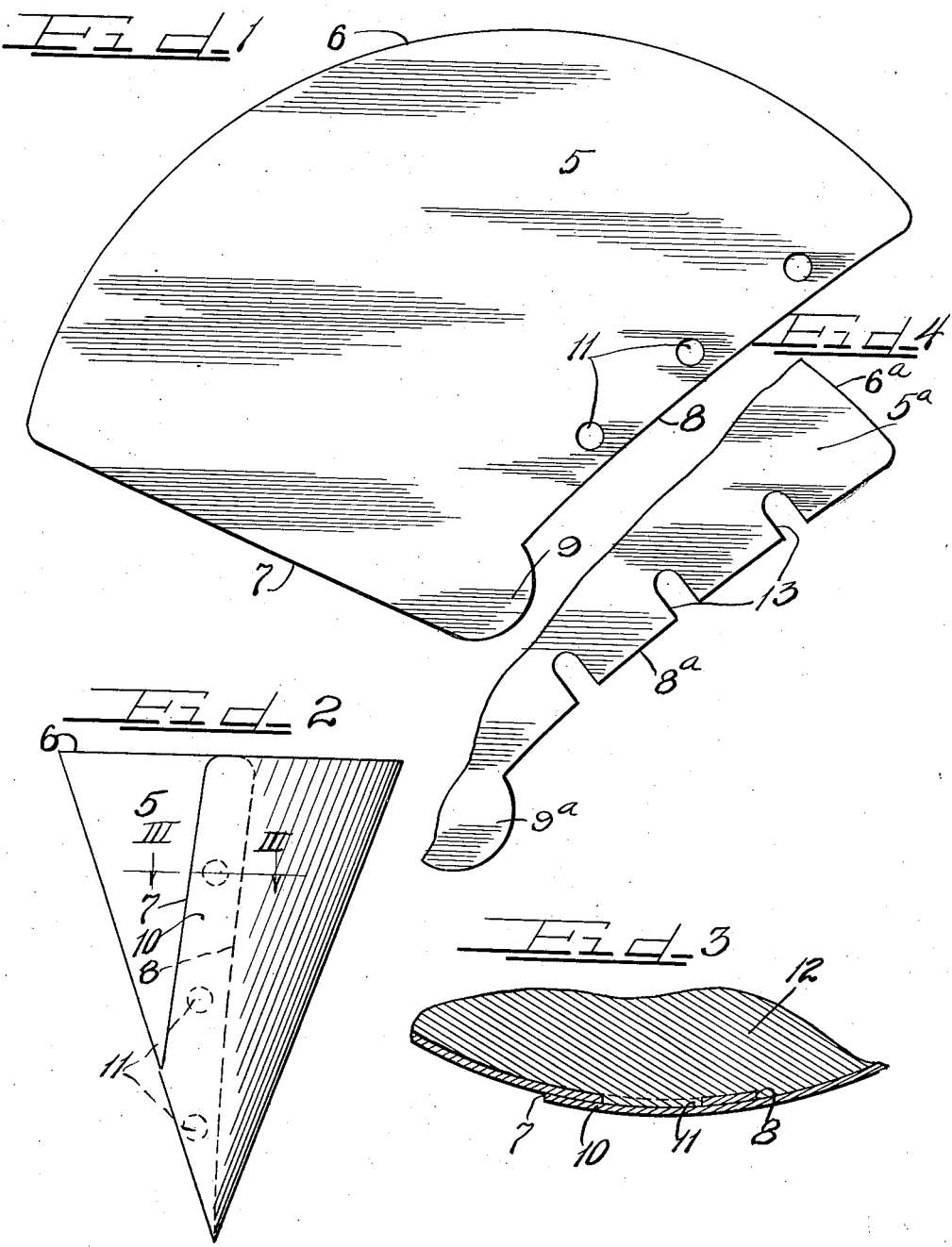

2,156,328

UNITED STATES PATENT OFFICE 2,156,328

CONFECTIONERY WRAPPER AND METHOD OF PACKAGING CONFECTIONERIES

Cesare Barbieri, New York, N. Y., assignor to Dixie-Vortex Company, Chicago, Ill., a corporation of Delaware Application March 27, 1937, Serial No. 133,345

7 Claims. (Cl. 99—180)

This invention relates to the packaging of confectioneries, and more particularly to a wrapper for a confection, such, for example, as sherbet, ice cream or the like, and to a method of utilizing the wrapper, although the invention may have other uses and purposes as will be apparent to one skilled in the art.

Ice cream and the like frozen comestibles are now frequently packaged in individual servings, each in a separate wrapper. This not only eliminates the loss occurrent to the retailer in dispensing ice cream from bulk containers, but provides a sanitary way of serving the particular commodity and also insures each purchaser receiving the same amount as every other purchaser.

I am aware that a wrapper or container for confectioneries has been provided which comprises a blank formed into the shape of a conical cup with overlapping marginal portions of the blank held together by adhesive of such amount and character or such amount and location as merely to hold the cup in shape, but being insufficient to preclude ready separation of the side edges when the blank or container is stripped from its contents. This container is, of course, preformed in cup shape prior to having the ice cream or other commodity completely frozen therein. Such a container is set forth, described and claimed in Andrew C. Wood U. S. Letters Patent No. 1,964,238, issued June 26, 1934.

In addition, I am also aware that wrappers have been provided for ice cream and similar commodities, which wrappers are in the form of blanks and are not preformed into their ultimate shape prior to their insertion in a carrier or holder for the reception of the commodity. In other words, the tray or holder maintains the wrapper in shape, there being no securing means whatsoever to hold the overlapped marginal portions of the wrapper together. When the commodity is frozen in and to the wrapper, the adherence of the commodity to the wrapper maintains the wrapper in shape until it is ultimately stripped from the confection at the time of serving.

It is desirable to provide a wrapper of such character which, while having no securing means associated with the wrapper itself for holding the overlapped marginal portions together, nevertheless affords a relatively wide protective overlap of the marginal portions, which portions are not left free to become accidentally separated and thus expose the contents.

To this end, it is an object of the present invention to provide a wrapper for a frozen comestible such as ice cream, which wrapper may be formed into cup or container shape, with overlapped marginal portions held together against accidental displacement by the adherence of the confection itself to the wrapper.

Also an object of the invention is to provide a container for a frozen comestible, the container having overlapped marginal portions of which the inner is provided with a suitable opening or openings through which the confection may contact with and be frozen to outer of the overlapped marginal portions, and thus afford a simple securement of the marginal portions sufficiently to prevent accidental separation until the time of serving of the confection.

Another feature of the invention resides in the provision of a container blank shaped so as to readily assume proper container form when placed in a tray or holder, and also so shaped that the weight of the comestible placed therein aids in maintaining the blank in proper form until the comestible has been frozen therein and thereto.

It is also an object of this invention to provide a container for a frozen comestible, such as ice cream, which container has overlapped marginal portions and is so constructed that the frozen comestible may contact with and adhere to the outer one of the overlapped margins in the region of overlap.

While some of the more salient features, characteristics and advantages of the present invention have been above pointed out, others will become apparent from the following disclosures, taken in conjunction with the accompanying drawing which illustrates two embodiments of the invention, and in which:

Figure 1 is a plan view of a blank embodying features of the present invention;

Figure 2 is a side elevational view of a container formed from the blank of Figure 1;

Figure 3 is an enlarged fragmentary plan sectional view taken substantially as indicated by the line III—III of Figure 2, showing the container with the frozen comestible therein; and Figure 4 is a fragmentary plan view of a blank of somewhat different form.

As shown on the drawing:

For the purpose of clarity, the wrapper or container and the method of using the same will be herein described in connection with ice cream, although it will be appreciated that the wrapper may equally as well serve for the packaging of ices, sherbets and other commodities of a frozen or unfrozen semi-solid condition.

In the illustrated embodiment of the present invention seen in Figures 1 to 3, inclusive, there is shown a blank 5 which may be made of any suitable material, such as paper of the type commonly used in paper drinking cups and the like. This blank, in the illustrated instance, is generally in the form of a sector of a circle and has an outer convexly arcuate edge 6 for defining the mouth of the resultant container formed from the blank. The ends of the curved edge 6 terminate in inwardly converging side edges 7 and 8, of which the side edge 7 is substantially straight and the side edge 8 is slightly curved inwardly to facilitate formation of the blank into container shape. The edge 7 may, if so desired, be curved somewhat to afford a saving in stock.

The inner extremities of the edges 7 and 8 terminate in a curved lateral extension or tab 9 which is somewhat in line with the edge 7 but projects outwardly from the edge 8. In this instance, the blank 5 results in the formation of a container or cup having substantially a true conical shape as seen in Figure 2, and the projection or tab 9 is loosely wound around the lower end of the cup near the apex thereof, in which position the tab affords a readily accessible means in the nature of a tear or stripping tab by which the operator may readily strip the cup from its contents, as more fully described in the aforesaid Letters Patent No. 1,964,238.

It will be noted that when the blank 5 is formed into container shape, the marginal portions adjacent the edges 7 and 8 are overlapped, as indicated at 10 in Figures 2 and 3. In order to insure a sufficient binding in this region of overlap to avoid accidental separation of the margins until it is desired to strip the container from its contents, the margin adjacent the edge 8, which is the inner margin in the resultant container is preferably provided with an opening or openings of sufficient size and such location as to permit the contents of the container to adhere to the inner face of the outer overlapped margin adjacent the edge 7. In the illustrated instance, the inner margin is provided with a series of apertures 11, and when the container is filled with ice cream 12 (Figure 3), and the ice cream is frozen in and to the container, the ice cream will extend through each of the apertures 11 and be frozen to the inner face of the outer overlapped margin, thus providing the desired bond between the margins.

The present invention lends itself to an extremely simple method of use. It is simply necessary to take a blank 5, and by hand or any suitable means place the same in a conical holder in cup shape. Semi-frozen ice cream is then poured into the cup, it not being necessary to have tightly sealed margins to prevent such a mixture from leaking. The weight of the ice cream mass tends to maintain the blank in container shape and maintain the overlapped margins tightly pressed together. The semi-frozen mass is then completely frozen in and to the container, and thereafter will maintain the container in proper shape due to its adherence thereto. As explained above, the ice cream will enter the apertures 11 and adhere to the inner face of the outer one of the overlapped margins, establishing a bond between the overlapped margins in the region of overlap.

When it is desired to dispense the ice cream, it is a simple expedient to pick up the container, and by the use of the tear tab 9, or by separating the overlapped margins at some other feasible point, to strip the wrapper entirely from its contents, dropping the contents into an edible cone holder or upon a dish, depending upon the desires of the purchaser.

In Figure 4, I have illustrated a modified form of construction, wherein a blank 5a having the same general shape as the aforesaid blank 5 is provided along the respective edge 8a with a plurality of spaced notches or slots 13, which function in the same manner as above explained in connection with the apertures 11.

Of course, the apertures 11 or the slots 13 may be provided at any desirable spacing or in any suitable number, and the size of the apertures or slots may be varied as may be deemed most feasible. The main object is to provide a suitable form of opening of such location and size as to permit a reasonably wide overlap of the marginal portions of the blank, and also to permit the contents of the wrapper to establish a suitable bond with the outer overlapped margin.

From the foregoing, it is apparent that I have provided a novel wrapper highly desirable for use with frozen comestibles, which is simple in construction, may be used with great facility, is very economical to manufacture and use, and which is highly efficient in operation.

I am aware that many changes may be made and numerous details of construction may be varied through a wide range without departing from the principles of this invention, and I, therefore do not purpose limiting the patent granted hereon otherwise than is necessitated by the prior art.

I claim as my invention:

1. As an article of manufacture, a blank for a conical cup for receiving a frozen confection, including a sheet of stock of the general shape of a sector of a circle with a curved outer edge for defining the mouth of the cup and a pair of inwardly converging side edges, the margins adjacent said side edges being overlapped in the completed cup, and the inner of these margins having an opening therein through which the contents of the cup may contact the inner side of the outer margin to maintain these margins in overlapped condition until the cup is stripped from its frozen contents by separating said margins.

2. As an article of manufacture, a container for a frozen confection made from a blank formable into container shape with a pair of overlapped marginal portions, the inner one of said margins having an opening therein through which the contents of the container may contact and adhere to the outer margin to hold the margins together.

3. As an article of manufacture, a container blank having a pair of edges adjacent which the margins are overlapped in the container formed from the blank, said blank having a plurality of spaced slots in the inner one of said margins leading inwardly from the respective blank edge through which the contents may contact and adhere to the inner face of the outer margin to hold the margins together.

4. As an article of manufacture, a container blank having a pair of marginal portions which are disposed in overlapped relationship in the completed container, the inner one of said marginal portions having an opening therein of such size and location that the contents of the container may adhere to the outer of said marginal portions in the region of overlap to bind said portions together against accidental separation but permit ready separation thereof when it is desired to remove the contents from the container.

5. As an article of manufacture, a packaged frozen confection, including a wrapper made from a blank shaped to provide overlapped portions, a confection frozen in and to said wrapper, the inner one of said overlapped portions having an opening therein through which said confection extends and is frozen to the outer portion to effect a bond in the region of overlap.

6. The method of packaging a frozen confection in a container formed from a blank having an opening in a marginal portion thereof, including shaping the blank into container form with overlapped marginal portions of which that having the opening is the inner, filling the container to a desired extent with a mass of confection and relying on the weight of the mass to temporarily hold the container in shape, and freezing the mass in and to said container and to the outer of said overlapped marginal portions through said opening.

7. The method of packaging a frozen confection in a container formed from a blank having an opening in a marginal portion thereof, including the steps of shaping the blank into container form with overlapped marginal portions of which that having the opening is the inner, filling the container to a desired extent with a mass of confection, and freezing the mass of confection in and to the container and to the outer of said overlapped marginal portions through the opening in the inner of the overlapped marginal portions.

CESARE BARBIERI.